United States Patent
Yoshioka

(10) Patent No.: US 6,791,577 B2
(45) Date of Patent: Sep. 14, 2004

(54) OPERATION GUIDANCE DISPLAY PROCESSING SYSTEM AND METHOD

(75) Inventor: Kenji Yoshioka, Tokyo (JP)

(73) Assignee: NEC Corporation, Tokyo (JP)

( * ) Notice: Subject to any disclaimer, the term of this patent is extended or adjusted under 35 U.S.C. 154(b) by 495 days.

(21) Appl. No.: 09/858,486

(22) Filed: May 17, 2001

(65) Prior Publication Data

US 2002/0055793 A1 May 9, 2002

(30) Foreign Application Priority Data

May 18, 2000 (JP) ........................................ 2000-146435

(51) Int. Cl.[7] ................................................. G06F 3/14
(52) U.S. Cl. ....................... 345/705; 345/711; 345/707; 345/709; 345/835; 345/864
(58) Field of Search ................................. 345/856, 705, 345/707, 709, 708, 835, 837, 809, 711, 864

(56) References Cited

U.S. PATENT DOCUMENTS

| | | | |
|---|---|---|---|
| 4,701,011 A | 10/1987 | Emkey et al. | 350/96.18 |
| 4,902,330 A | 2/1990 | Sakai et al. | 65/30.13 |
| 5,018,082 A * | 5/1991 | Obata et al. | 364/521 |
| 5,042,006 A | 8/1991 | Flohrer | 364/900 |
| 5,258,748 A | 11/1993 | Jones | 345/172 |
| 5,774,118 A * | 6/1998 | Hatakama | 345/707 |
| 5,831,598 A | 11/1998 | Kauffert et al. | 345/168 |
| 6,014,483 A | 1/2000 | Thual et al. | 385/33 |
| 6,061,576 A | 5/2000 | Terrasson | 455/566 |

FOREIGN PATENT DOCUMENTS

| | | |
|---|---|---|
| DE | 3831322 | 3/1990 |
| EP | 0292 934 | 11/1988 |
| EP | 0 315 956 | 5/1989 |
| EP | 01130892 | 1/2002 |
| JP | 63-291111 | 11/1988 |
| JP | 7-129348 | 5/1995 |
| JP | 8-106371 | 4/1996 |
| JP | 11-85438 | 3/1999 |

OTHER PUBLICATIONS

Chinese OfficeAction dated Sep. 26, 2003 with Japanese translation.

Japanese Office Action dated Oct. 28, 2003 with English translation of pertinent portions.

Inspec Online, IEEE, "Low Loss Light Focussing Fibers manufactured by a continuous process", Inoue et al. XP002194082.

Handbook of Optics, vol. II, Devices, Measurements and Properties, 2nd Edition, 1995, McGraw Hill.

* cited by examiner

*Primary Examiner*—Kristine Kincaid
*Assistant Examiner*—Thomas T. Nguyen
(74) *Attorney, Agent, or Firm*—Whitham, Curtis & Christofferson, PC

(57) ABSTRACT

As portable telephone capabilities increase, access to the myriad of features requires users to be familiar with multiple levels of functioning for each of the limited buttons available on the portable telephones. The Operation Guidance Display Processing System and Method provides an enhanced display that guides the user through the operation of various functions relative to the available buttons. The operation guidance display can be enabled or disabled by the user. In addition, the display can also assess the competency of the user during function operation and display operation guidance relative to the users own skill level.

3 Claims, 10 Drawing Sheets

FIG. 4

| | IMAGE | | | | | | | PRESET VALUE |
|---|---|---|---|---|---|---|---|---|
| | A | B | C | D | E | F | – | – |
| DIRECTORY FUNCTION | 0 | 0 | 1 | 1 | 1 | 1 | 0 | 0 | 3C |
| SCHEDULING FUNCTION | 0 | 1 | 1 | 0 | 1 | 0 | 0 | 0 | 68 |
| VOLUME ADJUSTING FUNCTION | 1 | 1 | 1 | 1 | 1 | 0 | 0 | 0 | 78 |
| MAILING FUNCTION | 0 | 0 | 1 | 0 | 0 | 0 | 0 | 0 | B0 |
| IMAGE PRESETTING FUNCTION | 0 | 1 | 1 | 0 | 1 | 0 | 0 | 0 | 68 |

FIG. 5

| IMAGE | BUTTON | | | | | | | | PRESET VALUE |
|---|---|---|---|---|---|---|---|---|---|
| | 1 | 2 | 3 | 4 | 5 | 6 | 7 | 8 | |
| A | 1 | 0 | 1 | 0 | 0 | 0 | 0 | 0 | A0 |
| B | 1 | 1 | 1 | 0 | 0 | 0 | 0 | 0 | E0 |
| C | 1 | 1 | 1 | 1 | 1 | 1 | 1 | 1 | FF |
| D | 1 | 0 | 0 | 0 | 0 | 0 | 0 | 0 | 80 |
| E | 0 | 0 | 1 | 0 | 0 | 1 | 0 | 0 | 24 |
| F | 0 | 0 | 0 | 0 | 0 | 0 | 1 | 0 | 02 |

OPERATION GUIDANCE DISPLAY PROCESSING SYSTEM AND METHOD

FIELD OF THE INVENTION

The present invention relates to an information processing system, information processing process and a program product, and in particular to an information processing system, information processing process and a program product for guiding a predetermined operation by displaying the operation guide on a given display screen when the predetermined operation is conducted.

BACKGROUND OF THE INVENTION

Portable telephone terminals which have voice as the primary function, are used as remote information processing terminals, as well as various functions. The functions are available by conducting presetting operations through actuation of operation buttons on the terminal.

However, the number of operation buttons which are mounted on the portable telephone terminal is very limited due to reduction in size and weight thereof. Recently when the portable telephone terminals have begun to play a role of personal information terminal, assignment and arrangement of the operation buttons has been considered for improving the ease of presetting operation to use these functions.

SUMMARY OF THE DISCLOSURE

Since the number of the operation buttons can not be proportionally increased in association with the increase in additional functions, a limited number of operation buttons have to be shared for various features. Presetting operations have been sophisticated and complicated for users.

An approach to solve this problem is to display on a display screen a message (operation guidance) for guiding the user to operate the buttons. Such an operation guidance through message display is very effective for the users who do not understand how to operate the buttons, but is very tedious and distracting to the users who understand how to operate the features.

Accordingly, in order to cope with both users who do not understand how to operate and users who are accustomed to operation, the portable telephone terminal is provided with a function for presetting ON/OFF of the operation guidance display. This enables the users to preset the operation guidance display.

However, all users who are accustomed to operation do not understand how to conduct presetting for all functions. Some users understand some of them whereas other users do not understand how to preset all functions. Accordingly, some of the users may need the operation guidance display for some functions similarly to those who do not understand how to operate the features very well. Therefore, a set method in which presetting of ON/OFF of the guidance display conducted by the user such that the portable telephone terminal is not capable of displaying the operation guidance if needed, does not enhance the ease of operation.

The present invention was made to in view of such circumstances. It is an object of the present invention to provide an improved information system and process, in which the necessity of the operation guidance display is automatically determined for each of the functions based upon the user's operation performances to enable the operation guidance display when it is needed.

An information processing system according to a first embodiment is characterized in that the system comprises a display unit for displaying a presetting image on a screen for performing a predetermined presetting; operating means for conducting an operation for the operation corresponding to the image; presetting means for conducting presetting in response to the operation which is conducted by the operating means; a storing unit for storing information which is representative of whether or not an operation guidance for guiding the operation corresponding to the image conducted by the operating means is to be displayed for each of the presetting images; first determining means for determining whether or not the operation conducted by the operating means is incorrect; calculating means for calculating the rate at which the operation conducted by the operating means is incorrect based upon a result of the determination made by the first determining means; second determining means for determining whether or not the operating guidance is to be displayed based upon the rate which is calculated by the calculating means; updating means for updating the information representative of whether or not the operation guidance for guiding the operation corresponding to the image displayed by the operating means stored in the storing means in response to a result of the determination made by the second determining means; and operation guidance displaying means for displaying the operation guidance based upon the information stored in the storing unit.

There may be provided adjusting means for adjusting the period of time from a time the image is displayed until the operation guidance is displayed.

The adjusting means may adjust the period of time from a time the image is displayed until the operating guidance is displayed, based upon the rate at which the operation conducted by the operating means is incorrect, which is calculated by the calculating means.

The updating means may update the information representative of whether or not the operation guidance is to be displayed into the information representative of the operating guidance that is to be displayed when the period of time, measured by the measuring means, from a time the image is displayed until the operation corresponding to the image is conducted by the operating means is longer than a predetermined reference time.

According to a second embodiment of the present invention, an information processing system is characterized in that the system comprises a display unit for displaying a presetting image on a screen for performing a predetermined presetting; operating means for conducting an operation for the operation corresponding to the presetting image; presetting means for conducting presetting in response to the operation which is conducted by the operating means; a storing unit for storing information which is representative of whether or not an operation guidance for guiding the operation corresponding to the image conducted by the operating means is to be displayed for each of the presetting images; measuring means for measuring the period of time from a time the image is displayed until the operation corresponding to the presetting image is conducted by the operating means; updating means for updating the information representative of whether or not the operating guidance for guiding the operation corresponding to the presetting image displayed by the operating means stored in the storing unit in response to a result of the measurement made by the measuring means; and operation guidance displaying means for displaying the operation guidance based upon the information stored in the storing means.

The updating means may update the information representative of whether or not the operation guidance is to be displayed into the information representative of the operating guidance that is to be displayed when the period of time, measured by the measuring means, from a time the presetting image is displayed until the operation corresponding to the presetting image is conducted by the operating means is longer than a predetermined reference time.

According to a third embodiment of the present invention, an information processing method is characterized in that the method comprises (a) displaying step for displaying a presetting image on a screen for performing a predetermined presetting; (b) operating step for conducting an operation for the operation corresponding to the presetting image displayed on the screen; (c) presetting step of conducting presetting in response to the operation which is conducted in the operating step; (d) storing step of storing information which is representative of whether or not an operation guidance for guiding the operation corresponding to the image conducted in the operating step is to be displayed for each of the presetting images; (e) first determining step of determining whether or not the operation conducted in the operating step is correct; (f) calculating step of calculating the rate at which the operation conducted by the operating means is correct based upon a result of the determination made in the first determining step; (g) second determining step of determining whether or not the operating guidance is to be displayed based upon the rate which is calculated in the calculating step; (h) updating step of updating the information representative of whether or not the operation guidance for guiding the operation corresponding to the presetting image displayed in the operating step stored in the storing step in response to a result of the determination made in the second determining step; and (i) operation guidance displaying step of displaying the operation guidance based upon the information stored in the storing step.

According to a fourth embodiment of the present invention, an information processing method is characterized in that the method comprises (a) displaying step for displaying a presetting image on a screen for performing a predetermined presetting; (b) operating step for conducting an operation for the operation corresponding to the presetting image displayed on the screen; (c) presetting step of conducting presetting in response to the operation which is conducted in the operating step; (d) storing step of storing information which is representative of whether or not an operation guidance for guiding the operation corresponding to the image conducted in the operating step is to be displayed for each of the presetting images; (e) measuring step of measuring the period of time from a time the image is displayed until the operation corresponding to the presetting image is conducted in the operating step; (f) updating step of updating the information representative of whether or not the operating guidance for guiding the operation corresponding to the presetting image displayed in the operating step stored in the storing step in response to a result of the measurement made in the measuring step; and (g) operation guidance displaying step of displaying the operation guidance based upon the information stored in the storing step.

According to a fifth embodiment of the present invention, there is provided a program product characterized by a program for executing the information processing method according to the third or fourth embodiment.

In the information processing system, information processing method and program product of the present invention, a presetting image for conducting a given presetting is displayed, an operation to conduct the presetting corresponding to the presetting image is performed. Presetting corresponding to the operation is conducted. Information representative of whether or not the operation guidance to guide the operation corresponding to the presetting image is stored for each presetting image. Determination whether or not the operation is incorrect is made. The rate at which the operation is incorrect is calculated based upon a result of determination. Determination whether or not the operation guidance is to be displayed on the screen is made based upon the calculated rate. Stored information representative of whether the operation guidance to guide the operation corresponding to the presetting image is updated based upon a result of the determination. Based upon the stored information, the operation guidance is displayed on the screen. Alternatively, the period of time since a presetting image is displayed until the operation corresponding to the presetting image is conducted is measured. The stored information representative of whether or not the operation guidance for guiding the operation corresponding to the presetting image is updated in response to a result of measurement. The operation guidance is displayed on a screen based upon stored information.

BRIEF DESCRIPTION OF THE DRAWINGS

FIG. 4 is a table showing an exemplary data configuration of the information representative of operation guidance display object images.

FIG. 5 is a table showing an exemplary data configuration of information representative of correct operation.

PREFERRED EMBODIMENTS OF THE INVENTION

The present invention relates to operation guidance display for operation guidance when any of various functions of mobile telephone such as portable telephone or personal handy phone. The present invention is characterized in that presence or absence of operation guidance display, contents to be displayed and/or display timing, etc. are automatically controlled depending upon the user's state of usage, (i.e., user's state of operation performances).

Figure 1:
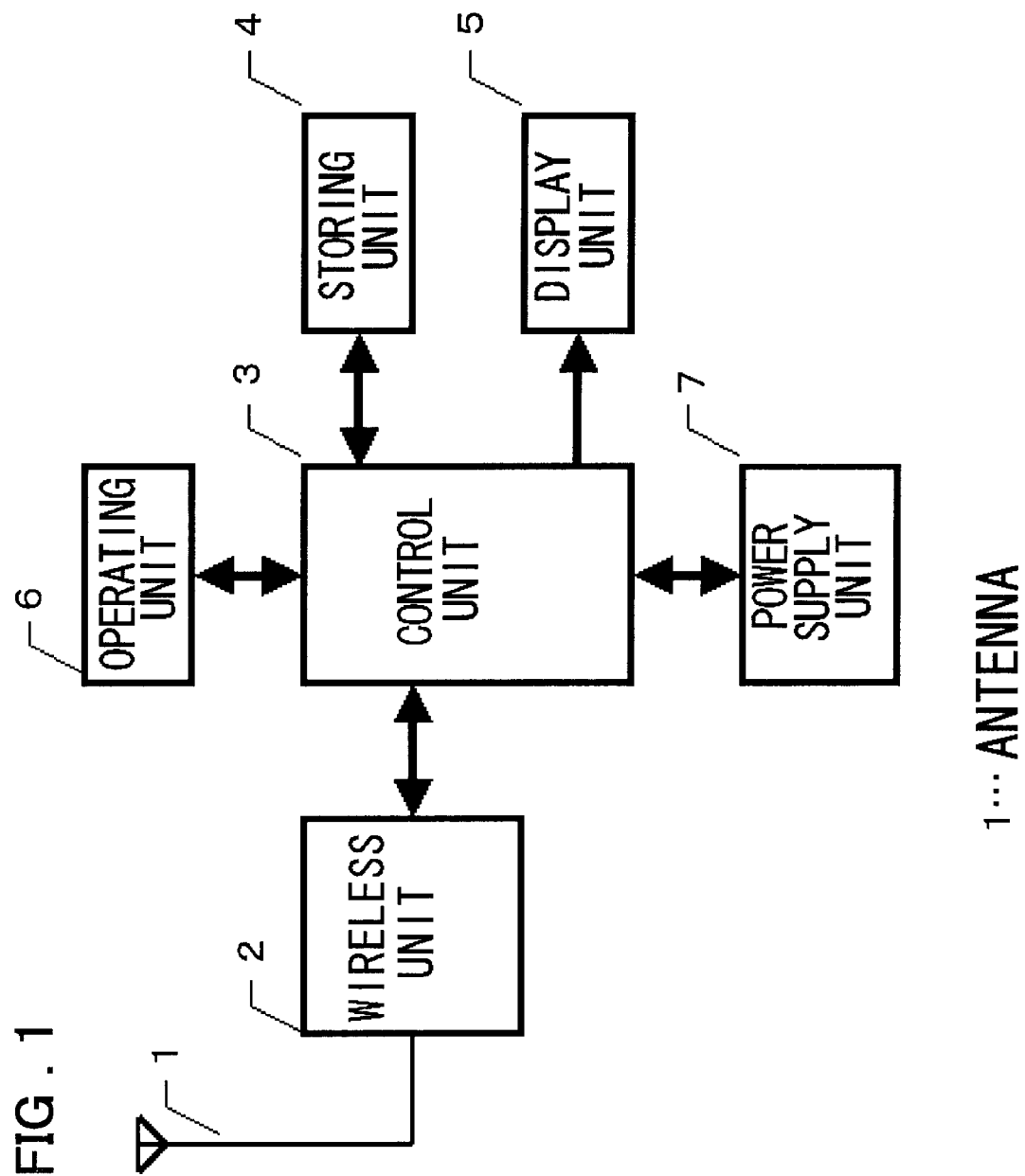
FIG. 1 is a block diagram showing an exemplary structure of one embodiment of the information processing system of the present invention.

FIG. 1 shows an exemplary configuration of mode of embodying the mobile telephone such as portable telephone or simplified portable telephone to which the information processing system of the present invention is applied. Now, the configuration of the mode of embodying the present invention will be described with reference to FIG. 1.

As shown in the drawing, the present embodiment comprises an antenna 1, wireless unit 2, control unit 3, storing unit 4, display unit 5, operating unit 6 and power supply unit 7. The antenna 1 receives the radio frequency signal and converts it to a radio frequency wireless signal. The wireless unit 2 conducts frequency conversion and noise elimination for the radio frequency wireless signal corresponding to the radio waves received by the antenna 1 and thereafter conducts demodulation for conversion of the demodulated signal into the digital signal.

On reception of an incoming call, the control unit 3 detects information data on the caller's directory number from the digital signal which is demodulated by the wireless unit 2 and converts the data into the directory number. The operating unit 6 is adapted to operate for presetting various functions and comprises a plurality of operation buttons (not shown) which will be simply referred to as "button(s)" hereafter. The control unit 3 determines whether or not the operation through the operating unit 6 is correct. The control unit 3 also identifies the function corresponding to the operation conducted by the operating unit 6 and counts the number of operations, the number of correct operations and the number of incorrect operations in each display shot (image). The control unit 3 has a timer capability for measuring the period of time from the display of the image for conducting predetermined presetting to the operation by the user, or to the display of the operation guidance on the screen.

The storing unit 4 is adapted to store operation guidance display flag information data for each display shot, operation guidance display object screen information, and correct operation information. The storing unit 4 also stores data on the number of incorrect operations, data on the number of correct operations, data on the error rate, information on the error rate threshold in each display shot. The storing unit 4 also stores time data representative of the period of time from the display being made on the screen to the presetting operation, and presetting operation time threshold information in each display shot. The storing unit 4 also stores the data representative of the time period which is taken to display the operation guidance in each display shot (presetting image). The latter time period can be preset by the operating unit 6. The storing unit 4 stores reference data upon which the determination is made whether or not the operation conducted in each display shot (presetting image) is correct. The control unit 3 conducts processing such as reading, updating and writing of various data stored in the storing unit 4. The power supply unit 7 is adapted to supply the above-mentioned units with electric power.

Figure 2:
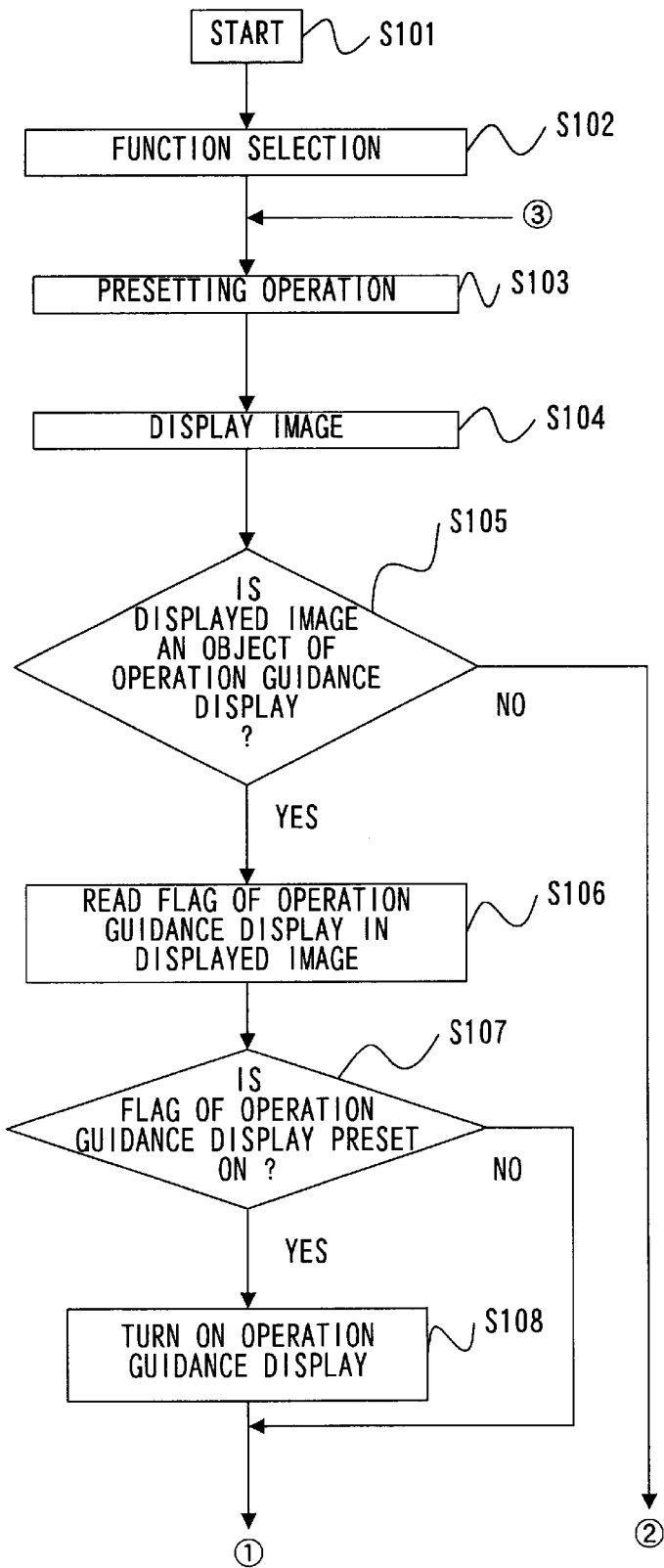
FIG. 2 is a flow chart explaining the operation of the embodiment shown in FIG. 1.

The operation of the embodiment will be described with reference to flow charts of FIGS. 2 and 3. When processing is started (step S 101), a user first selects one function by actuating an operation button (not shown) of the operating unit 6 (step S 102). After selection of the function, an operation for entering into a presetting mode is conducted (step S 103). The control unit 3 which has detected the event of the function selecting operation from the operating unit 6 causes the display unit 5 to display a presetting image for presetting the selected function (step S 104).

Subsequently, the control unit 3 determines whether or not to display an operation guidance based on the operation guidance display object image information which is stored in the storing unit 4 (step S 105). An example of the operation guidance display object image information is shown in FIG. 4.

As shown in FIG. 4, images A to F are prepared for directory function, schedule function, volume adjusting function, mail function and screen presetting function, respectively. In the drawing, preset values "0" and "1" denote that the corresponding operation guidance image is not or is an object of the operation guidance display, respectively.

An example is shown in which the present value representative of object/no-object in each image shot is represented by hexadecimal (hex) data for each function. In this case, the preset value for images A to F of directory function and reserve images (illustrated by "-" in the drawing) is 8 bit data including data for the reserve images and are represented as 00111100 (=3C hex). The preset value of the images A to F and the reserve images of the schedule function is 01101000 (=68 hex). The preset value of the images A to F and the reserve images of the volume adjustment is 01111000 (=78 hex). The preset values of images A to F and the reserve images of the mail function is 10110000 (=B0 hex). The preset value of the images A to F and the reserve images of the image presetting function is 01101000 (=68 hex).

Figure 6:
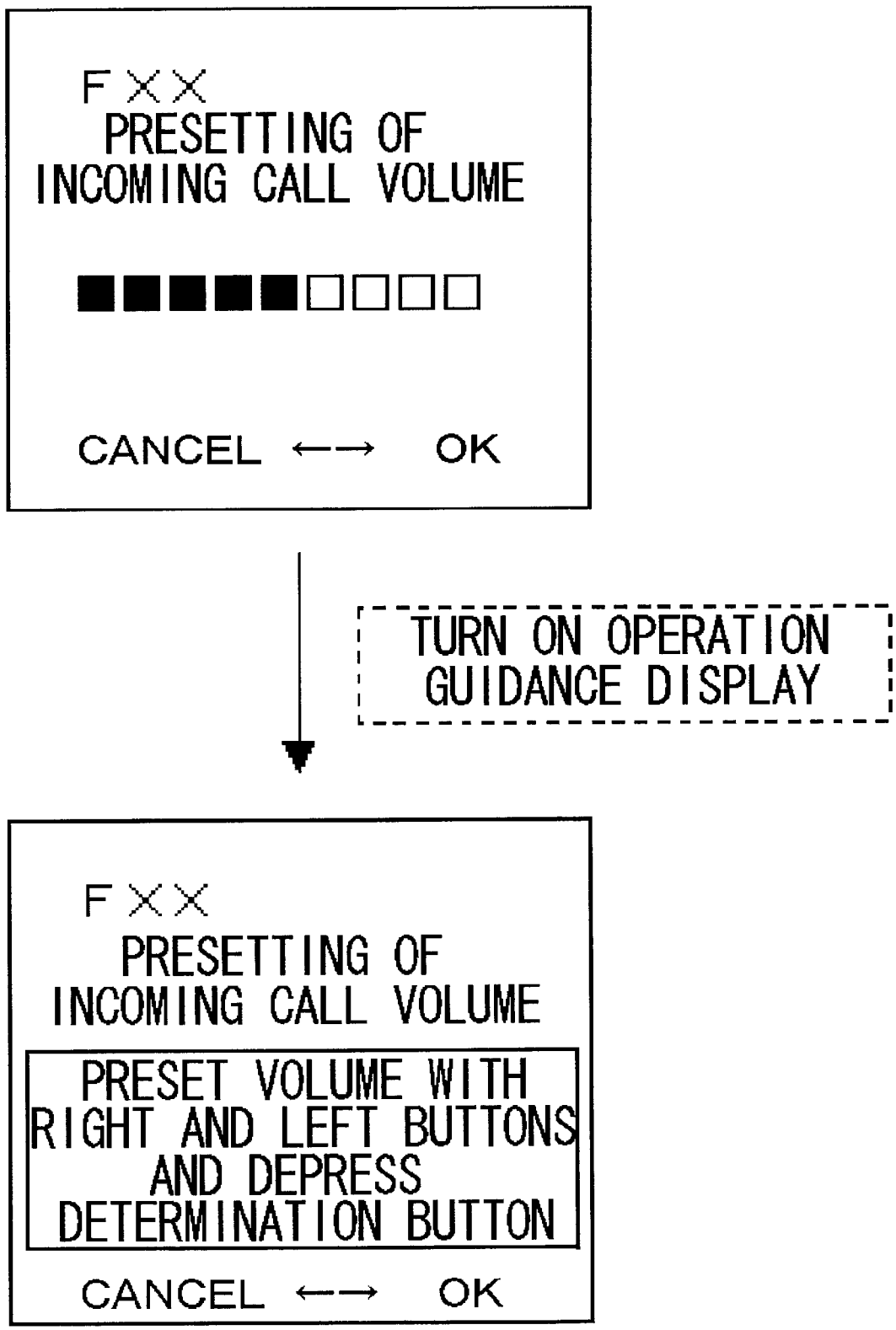
FIG. 6 is a diagram showing an example of the operation guidance display.

Determination of whether or not the displayed image is an object of the operation guidance is made based upon this preset value. If the displayed image is not an object of the operation guidance display (No at step S 105), the program sequence then will proceed to step S 117 (FIG. 3). On the other hand, if the displayed image is an object of the operation guidance display (YES at step S 105), the control unit 3 then reads the flag of the operation guidance display in the displayed image out from the storing unit 4 (step 5 106). If the flag of the operation guidance display is preset "ON" (YES at step 5 107), the control unit 3 causes the display unit 5 to display the operation guidance (step S 108). If the flag of the operation guidance display is preset "OFF" (No at step S 107), the control unit 3 does not cause the display unit 5 to display the operation guidance. An example of a presetting image that is displayed on the display unit 5 is shown in FIG. 6 as "FXX PRESETTING OF INCOMING CALL VOLUME". An example of the operation guidance that is displayed on the display unit 5 is shown in FIG. 6.

A display when the volume of the incoming call is preset is shown in FIG. 6. When the flag of the operation guidance display is preset "ON", an operation guidance "PRESET VOLUME WITH RIGHT AND LEFT BUTTONS AND PRESS DETERMINATION BUTTON" is displayed in a given position on the screen. The user is able to preset the incoming call volume by conducting the operation in accordance with the operation guidance.

Figure 3:
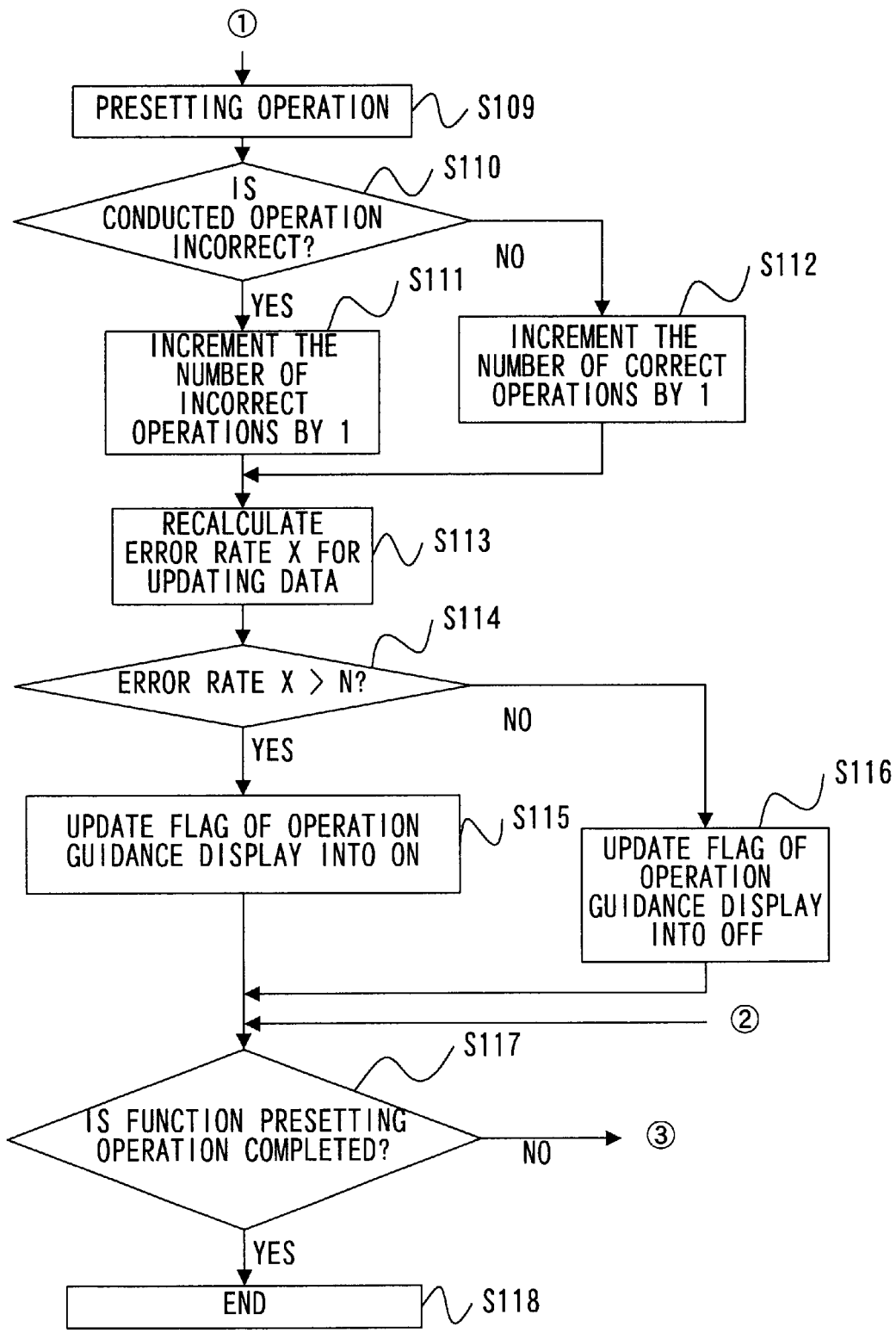
FIG. 3 is a continuation of the flow chart of FIG. 2.

When a presetting operation is conducted by the users shown in FIG. 3 (step S 109), the control unit 3 which has detected the event of the presetting operation of the user makes the determination whether or not the operation which was conducted by the user through the control unit 6 is correct with reference to the correct operation information stored in the storing unit 4 (step S110).

An example of the data configuration of the correct operation information is shown in FIG. 5. In the drawing, "0" and "1" denote incorrect and correct button operations, respectively. An example in which preset values of incorrect and correct operations are represented by HEX data for buttons #1 to #8 in images A to F is shown. In this example, the preset value of the buttons #1 to #8 in the image A is 10100000 (=A0 hex). The preset value of the buttons #1 to #8 in the image B is 11100000 (=E0 hex). The preset value of the buttons #1 to #8 on the image D is 10000000 (=80 hex). The preset value of the buttons #1 to #8 in the image E is 00100100 (=24 hex). The preset value of the buttons #1 to #8 in the image F is 0000010 (=02 hex).

Determination whether or not the operation which was conducted by the user through the operating unit 6 is correct is made with reference to the preset value. If it is an incorrect operation (YES at step S 110), the number of the incorrect operations stored in the storing unit 4 is incremented by one (step S 111). If it is correct operation, the number of the correct operations stored in the storing unit 4 is incremented by one (step S 112).

When the processing at step S 111 or S 112 is completed, the control unit 3 calculates the error rate based upon the updated numbers of incorrect and correct operations in accordance with the following formula for updating the data on the error rate X stored in the storing unit 4 (step S 113).

Error rate X=the number of incorrect operations/(the number of the incorrect operations+the number of the correct operations).

Subsequently, the control unit 3 compares the determined error rate X with the threshold of the error allowance preliminarily stored in the storing unit 4 (step S 114). If the error rate 4 satisfies the following equation, $$\text{Error rate } X > N,$$

that is, the error rate X is larger than the error rate threshold value N (YES at step S 114), the flag of the operation guidance display is updated into "ON" (step S 115).

On the contrary, if the following equation $$\text{Error rate } X \leq N$$

is satisfied, that is, the error rate X is equal to or smaller than the error rate threshold N (NO at step S 114), the flag of the operation guidance display is updated into "OFF" (step S 116).

When the processing at step S 115 or S 116 is completed, the control unit 3 then determines whether or not the event of the completion of the function presetting operation has been detected from the operating unit 6 (step S 117). If it is determined that the event of the completion of the function presetting operation has not been detected (NO at step S 117), the program sequence will then return to step S 103 and the processing which is subsequent to step S 103 is repeated.

If it is determined that the event of the completion of the function presetting operation has been detected (YES at step S 117), the processing which is related with the operation guidance display is ended (step S 118).

As mentioned above, the following advantages can be obtained in accordance with the present embodiment. Presetting of ON/OFF of the operation guidance display can be automatically conducted depending upon the user's operation usage (history or registered scores). This makes it possible to display an operation guidance when the user is at a loss how to operate or is liable to conduct misoperation and to display no operation guidance when the user is accustomed to or easy to operate the terminal. Since the above-mentioned feature is not stereo-type and are performed as learning effect depending upon the user's usage, a display operation environment which is suitable for individual users can be provided and positive and reliable operation can be guided for complicated functional operation. An enhancement in ease of operation can be achieved for every user.

Now, operation of the other embodiment will be described with reference to the flow charts of FIGS. 7 and 8. Since the configuration of the present embodiment is substantially identical with that described with reference to FIG. 1, its illustration and description will be omitted. In the embodiment which will be described with reference to FIGS. 7 and 8, the period of time which is taken until the operation guidance is displayed is optimized by dividing the level of the error rate and by providing a plurality of error rate thresholds. Although two thresholds are preset in this embodiment, more thresholds may be preset if complication of processing is allowed. In this case, the flow chart of the processing is substantially identical with that which will be described in the present embodiment.

When processing is started (step S 201), the user firstly selects a function by depressing a button(s) of the operating unit 6 (step S 202). After selection of function, the user conducts an operation to bring the terminal into a function presetting mode (step S 203). The control unit 3 which has detected the event of the function selecting operation from the operating unit 6 causes the display unit 5 to display an image corresponding to the selected function (step S 204).

Subsequently, the control unit 3 determines whether or not the displayed image is an object of the operation guidance display with reference to information on the operation guidance display object image which is stored in the storing unit 4 (step S 205). An example of date configuration of the operation guide display object image information is shown in FIG. 4. In the figure, "0" and "1" denote no object of the operation guidance display and object of the operation guidance, respectively. An example in which the preset value representative of object/no object of each image for each function is represented by HEX data is illustrated.

Determination whether or not the displayed image is an object/not object of the operation guidance display is made with reference to the preset value. If the displayed image is not object of the operation guidance display (NO at step S 205), the program sequence will proceed to step S 224 (FIG. 8). If the displayed image is an object of the operation guidance (YES at step S 205), the control unit 3 reads the flag of the operation guidance display of the displayed image from the storing unit 4 (step S 206).

If the flag of the operation guidance display is preset "ON" (YES at step S 207) and the preset time until the operation guidance display is preset A (preset at step S 208), the control unit 3 resets the timer for turning the operation guidance display (step S 213) after the lapse of a predetermined period of time Ta (YES at step S 211) since the starting of T2 timer (step S 209).

Figure 8:
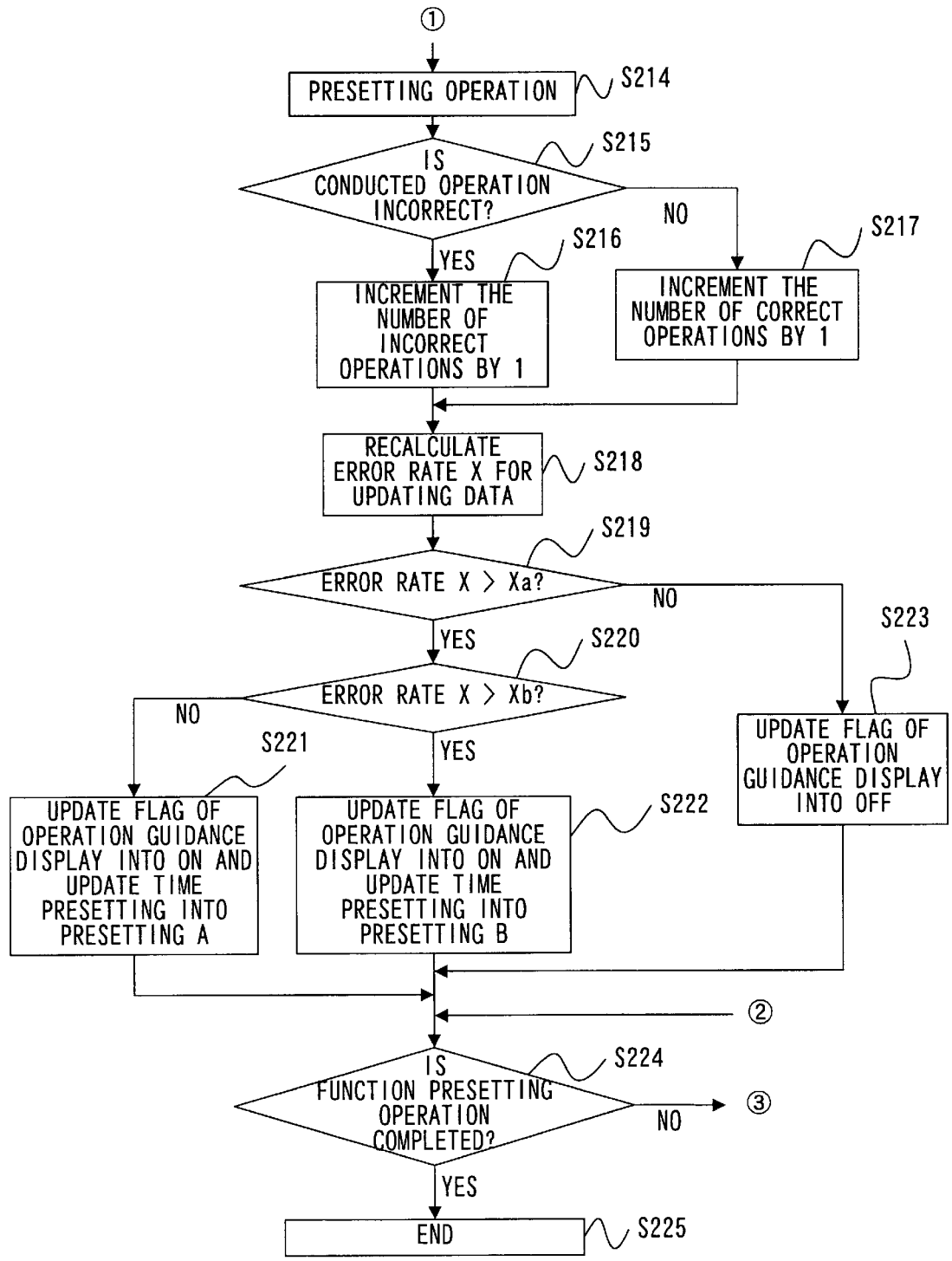
FIG. 8 is a continuation of the flow chart of FIG. 7.

If the flag of the operation guidance display is not preset "ON" (NO at step S 207), the program sequence then proceeds to step S 214 (FIG. 8). When the predetermined period of time Ta has not lapsed (NO at step S 211) since the starting of T2 timer (step S 209), the program sequence will then proceed to step 214. If the predetermined period of time Tb has not lapsed since the starting of the T2 timer (step S 210), the program sequence proceeds to step S 214.

The data on the preset time until the operation guidance display is stored in the storing unit 4. In the present embodiment, it is assumed that Ta>Tb and the relation between the preset A and B is so that error rate Xa of the preset A<error rate Xb of the preset B. If the flag of the operation guidance display flag is preset "OFF", the control unit 3 does not cause the display unit 5 to display the operation guidance. An example of the operation guidance display is shown in FIG. 6.

Subsequently, when a presetting operation is conducted by the user as shown in FIG. 8 (step S 214), the control unit 3 determines with reference to information on the correct operation stored in the storing unit 4 whether or not the operation which the user conducted is correct (step S 215). An example of the data configuration of the correct operation information is shown in FIG. 5. In the drawing, "0" and "1" denote incorrect and correct button operations, respectively. An example of the preset value of the incorrect/correct operations of each button for each image is represented by HEX data is shown. Determination whether the operation the user conducted is incorrect operation or not is made with reference to the preset value.

If it is determined that the incorrect operation has been conducted (YES at step S 215), the number of the incorrect operations which is stored in the storing unit 4 is then incremented by one (step S 216). If it is determined that the correct operation has been conducted (NO at step S 215), the number of the correct operations which is stored in the storing unit 4 is incremented by one (step S 217). When the processing at step 216 or 217 is completed, the control unit 3 then calculates the error rate X in accordance with the following formula based upon the update data on the numbers of the incorrect and correct operations for updating the data on the error rate X stored in the storing unit 4 (step S 218).

Error rate X=the number of incorrect operations/the number of incorrect operations+the number of correct operations Subsequently, the control unit 3 compares the error rate X with the error rate thresholds Xa, Xb which are preliminarily stored in the storing unit 4 for determine whether or not the following equations are satisfied (steps S 219, S220).

$$\text{Error rate } X > Xa$$

$$\text{Error rate } X > Xb$$

where Xa<Xb.

If the error rate X>Xb holds (YES at step S 220), the flag of the operation guidance display is then undated into "ON" and the preset time from the display of the predetermined preset image until the display of the operation guidance is updated into preset B and the data representative of the preset B is stored in the storing unit 4 (step S 222).

If Xa<error rate $X \leq Xb$ holds (NO at step S 220) the flag of the operation guidance is updated into "ON", the preset time from the display of predetermined preset image until the display of the operation guidance is updated into preset A and the data representative of the preset A is stored in the storing unit 4 (step S 221).

If error rate $X \leq Xa$ holds (NO at step S 219), the flag of the operation guidance display is updated into "OFF" and the data representative of "OFF" of the flag of the operation guidance display is stored in the storing unit 4 (step S 223).

Subsequently, the control unit 3 determines whether or not the event of the completion of the function presetting operation has been detected from the operating unit 6 (step S 224). If the event of the completion of the function presetting operation has not been detected from the operating unit 6 (NO at step S 224), the program sequence will then return to step S 203 for repeating the processing subsequent to step 203. If the event of the completion of the function presetting operation has been detected from the operating unit 6 (YES at step S 224), processing which is related with the operation guidance display is completed (step S 225).

Figure 7:
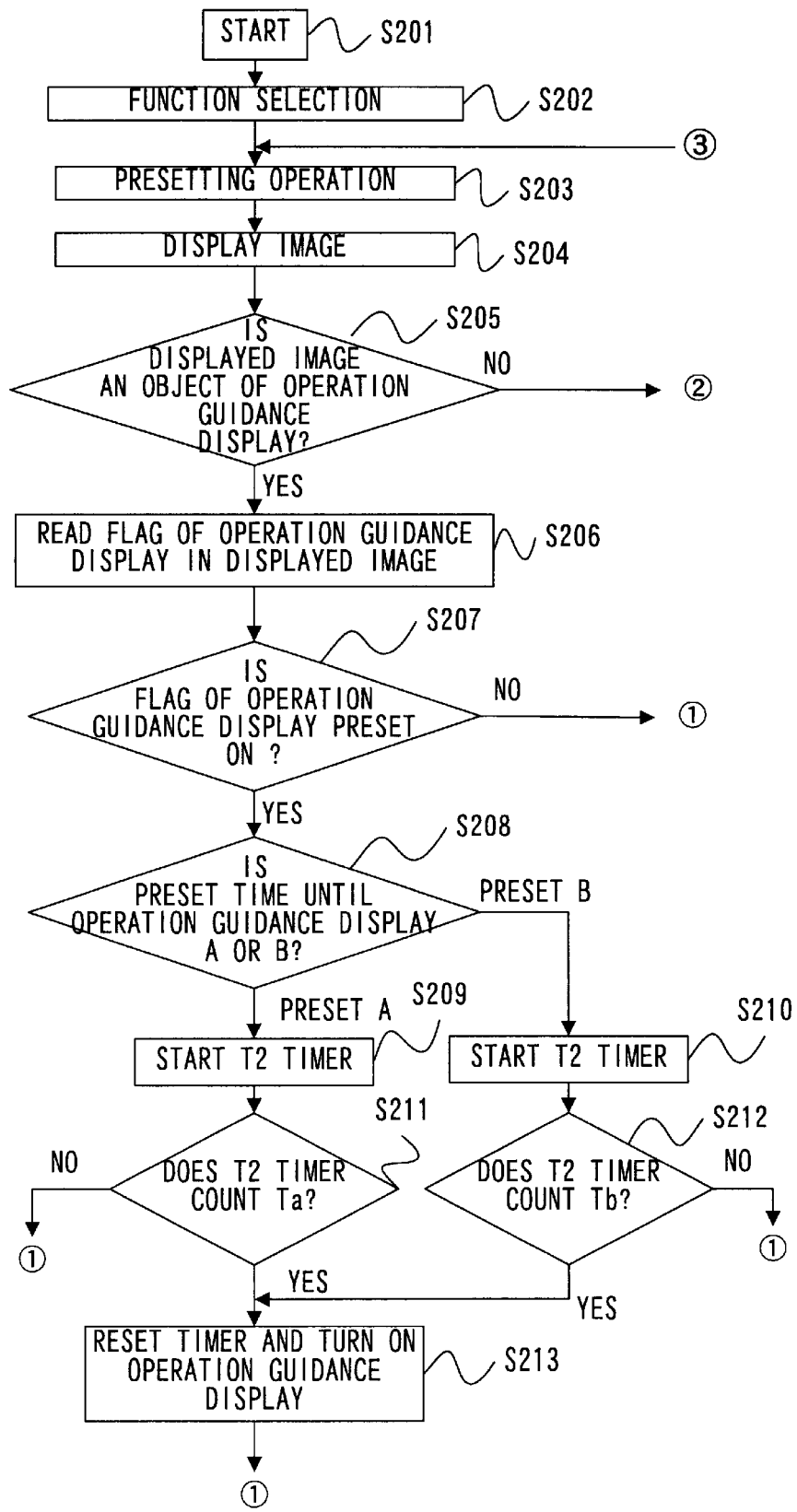
FIG. 7 is a flow chart explaining the operation of another embodiment of the present invention.

The embodiment which has been described with reference to FIGS. 7 and 8 provides an advantage which is similar to that of the embodiment which has been described with reference to FIGS. 1 to 6. In the embodiment which is shown in FIGS. 7 and 8, the period of time since the predetermined image is displayed until the operation guidance is displayed can be preset to a desired period of time. Whether the operation guidance is to be displayed or not can be preset depending upon the error rate X. When the operation guidance is displayed, the period of time since the image is displayed until the operation guidance is displayed may be variable depending upon the error rate X. This makes it possible to enhance the ease of operation conducted by users.

Figure 9:
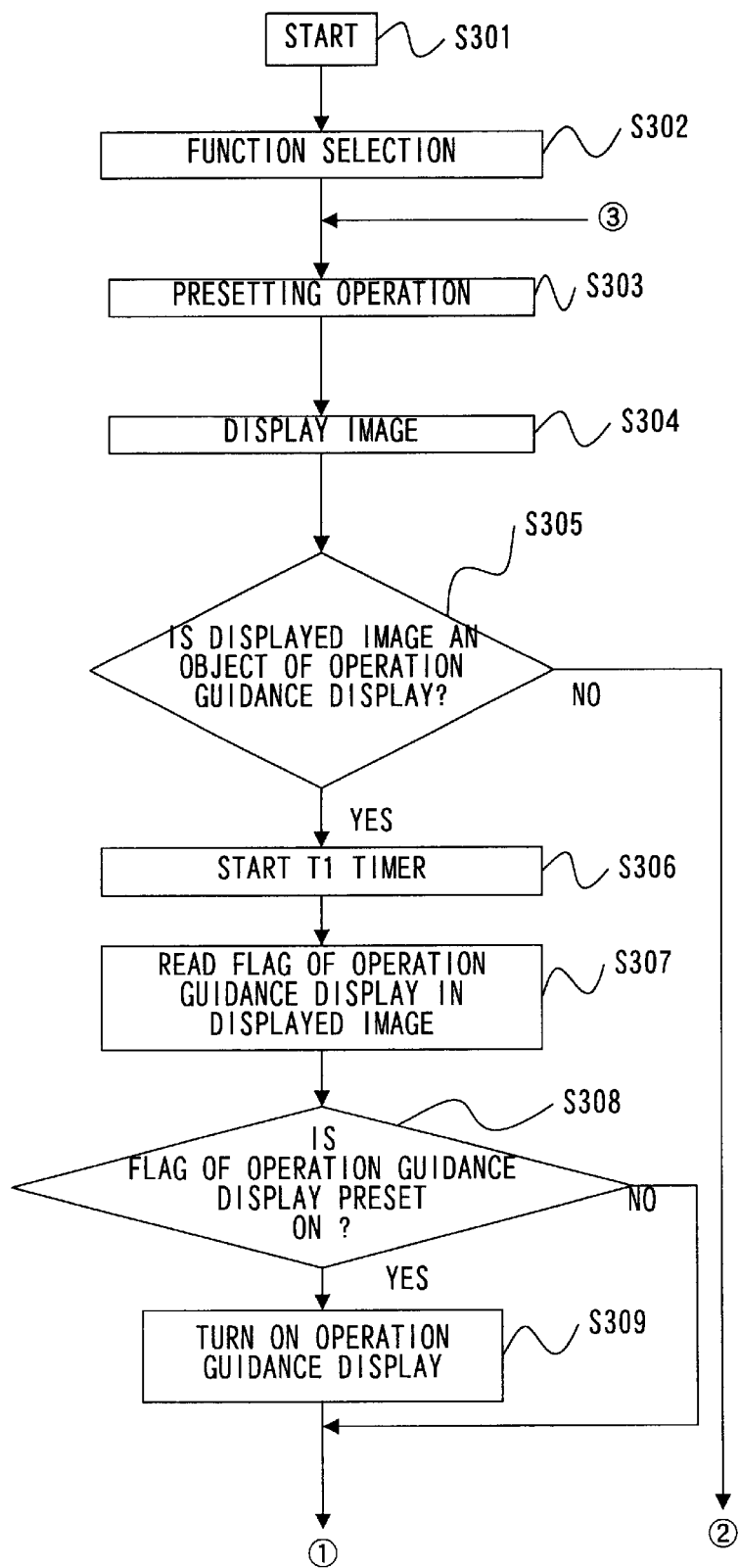
FIG. 9 is a flow chart explaining the operation the other embodiment of the present invention.

Now, the operation of a further embodiment of the present invention will be described with reference to flow charts of FIGS. 9 and 10. Since its structure is substantially identical with that which has been described with reference FIG. 1, its illustration and description will be omitted herein below. In the present embodiment, determination whether or not the operation guidance is necessary is made based upon the period of time since a given image is displayed until a given operation corresponding to the image is conducted by the user, which is considered as the level of difficulty of the operation for the image.

It is determined that the operation is more difficult so that the operation guidance is necessary as the period of time since the image is displayed until the operation is conducted becomes longer. Although an example in which only one threshold for this determination is preset will be described, more thresholds may be preset if the complication of the processing is allowed. In this case, the processing process is substantially identical with that in the present embodiment.

When processing is started (step S 301), the user firstly selects a function by depressing a button(s) of the operating unit 6 (step S 302). After selection of function, the user conducts an operation to bring the terminal into a function presetting mode (step S 303). The control unit 3 which has detected the event of the function selecting operation from the operating unit 6 causes the display unit 5 to display an image corresponding to the selected function (step S 304).

Subsequently, the control unit 3 determines whether or not the displayed image is an object of the operation guidance display with reference to information on the operation guidance display object image which is stored in the storing unit 4 (step S 305). An example of data configuration of the operation guide display object image information is shown in FIG. 4. In the drawing, "0" and "1" denote not object of the operation guidance display and object of the operation guidance, respectively. An example in which the preset value representative of object/not object of each image for each function is represented by HEX data is illustrated. Determination of the object/not object of the operation guidance display is made with reference to this preset value.

Figure 10:
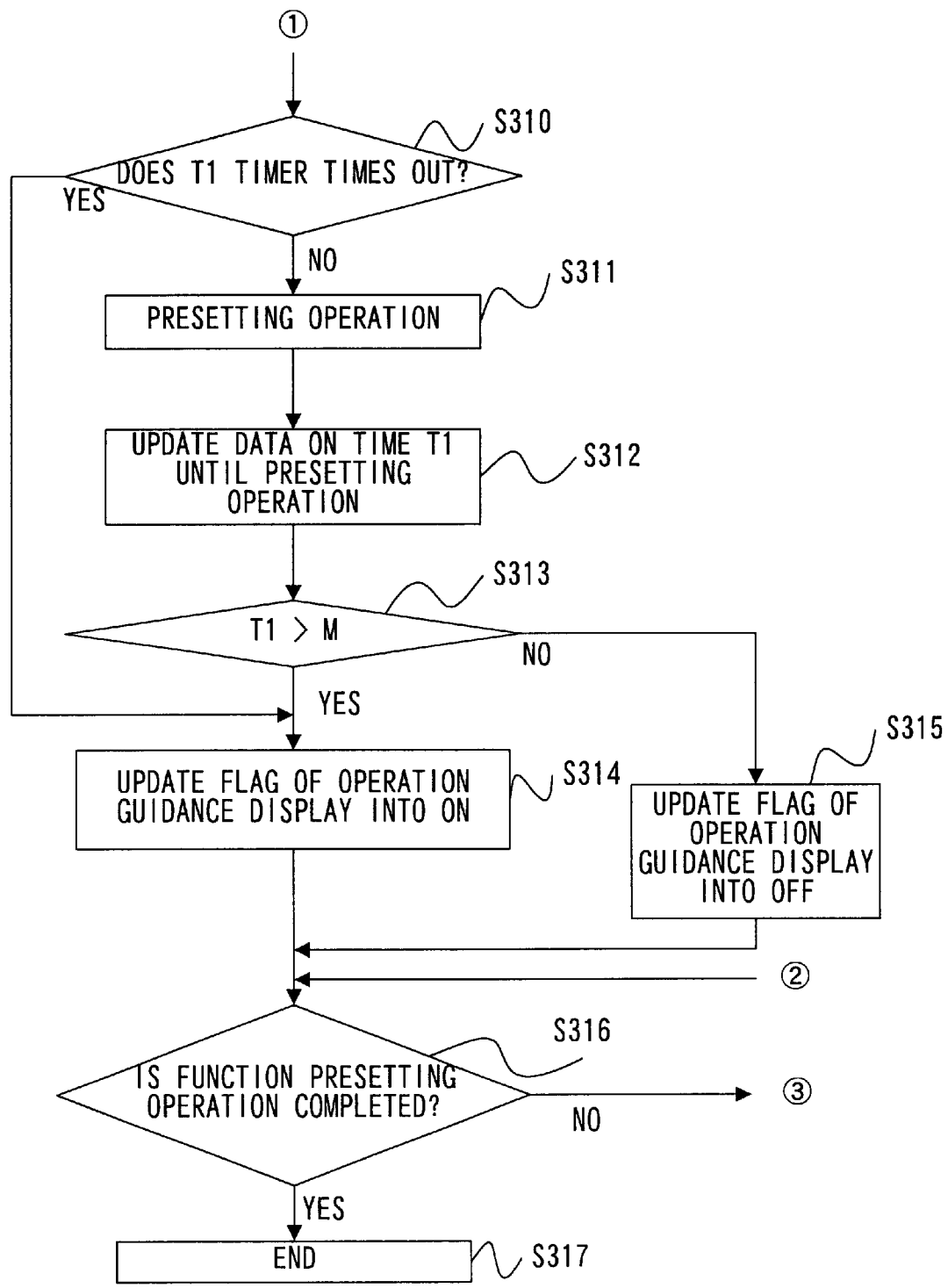
FIG. 10 is a continuation of the flow chart of FIG. 9.

If the displayed image is not object of the operation guidance display (NO at step S 305), the program sequence will proceed to step S 316 (FIG. 10). If the displayed image is an object of the operation guidance display (YES at step S 305), the control unit 3 starts T1 timer (step S 306). The T1 timer measures the period of time since the image is displayed until the user conducts an operation. After starting of the T1 timer, the control unit 3 reads the flag of the operation guidance display of the displayed image from the storing unit 4 (step S 307) and then determines whether or not the readout operation guidance display flag is preset "ON" (step S 308).

If the readout flag of the operation guidance display is preset "ON" (YES at step S 308) the control unit 3 then causes the display unit 5 to display the operation guidance (step S 309) and the program sequence will proceeds to step S 310. If the operation guidance display flag is preset "OFF" (NO at step S 308), the control unit 3 does not cause the display unit 5 to display the operation guidance and the program sequence will proceed to step S 310 (FIG. 10). An example of the operation guidance is shown in FIG. 6.

As shown in FIG. 10, the control unit 3 determines whether the control unit 3 times out a predetermined period of time. In other words, the control unit 3 determines whether or not the event of the presetting operation by the user has not been for a predetermined period of time (step S 310). If it is determined that the timer does not times out, that is, that the event of the user's presetting operation is detected within the period of time (NO at step S 310), presetting operation is conducted by the user (step S 311). The control unit 3 which has detected the event of the user's presetting operation updates the data representative of the period of time T1 since a given image is displayed until the presetting operation corresponding to the displayed image, which is stored in the storing unit 4 into the current value of the T1 timer (step S 312).

Subsequently, the control unit 3 compares time T1 with the threshold M of the presetting operation time which is preliminarily stored in the storing unit 4 (step S 313).

If the period of time until the presetting operation T1>M holds (YES at step S 313), then the operation guidance display flag is updated into "ON" (step S 314).

If the period of time until the presetting operation T1≦M (NO at step S 313), then the operation guidance display flag is updated into "OFF" (step S 315).

If T1 timer times out, that is, the control unit 3 does not detects the event of the presetting operation from the operating unit 6 within a predetermined period of time since T1 timer starts the timer operation (YES at step S 310), the control unit 3 updates the operation guidance display flag into "ON" (step S 314).

If processing of step S 314 or S 315 is completed, then the control unit 3 determines whether or not the event of the function presetting operation completion is detected from the operating unit 6 (step 316). If it is determined that the event of the function presetting operation completion has not been detected from the operating unit 6 (NO at step S 316), the program sequence will return to steps 303 for repeatingly executing the processing at and subsequent to step S 303. If it is determined that the event of the function presetting operation completion has been detected from the operating unit 6 (YES at step S 316), processing which is related with the operation guidance display is ended (step S 317).

The embodiment which has been described with reference to FIGS. 9 and 10 also provides the advantage similar to that of the embodiment which has been described with reference to FIGS. 1 to 6. In the embodiment which has been described with reference to FIGS. 9 and 10, it is determined that the user is and is not accustomed to the operation when the period of time since a given image is displayed until the user conducts the presetting operation corresponding to the image is shorter than or equal to and longer than a predetermined threshold, respectively. This makes it possible to enhance the ease of presetting operation by the user.

In a further modification of the present invention, the period of time since a given image is displayed until the operation guidance is displayed may be changed depending upon the period of time since the given image is displayed until the user conducts the presetting operation corresponding to the image. In other words, if the period of time since a given image is displayed until the user conducts the presetting operation corresponding to the image is relatively longer and shorter, the next period of time since image is displayed until the operation guidance is displayed may be made relatively shorter and longer, respectively.

For example, the users who are relatively accustomed to the presetting operation can be made more accustomed thereto by displaying the operation guidance as less as possible. The users who are not relatively accustomed to the presetting operation can be accustomed thereto quickly by displaying the operation guidance as early as possible. No operation guidance is displayed for the users who are well familiar with the operation. This enhances the ease of operation for the users.

The contents of the displayed operation guidance may be changed depending upon the user's learning level which is determined for each image from the error rate in user's presetting operation and the period of time since the image is displayed until the presetting operation is started. For example, the contents of the displayed operation guidance are made simpler and more complicated for the users having higher and lower learning levels, respectively. This makes it possible to further enhance the ease of operation.

The programs which execute the above-mentioned processing may be recorded on various recording media such as CD-ROM (compact disc read only memory), DVD (digital versatile disc), floppy disc, memory card, ROM (read only memory) and may be provided by down loading via the network, e.g., Internet. The programs control the operation of the control unit. The control unit which is controlled under programs executes a given processing which is instructed by the program.

Although the embodiments of the present invention which are applied to mobile telephones such as portable telephones have been described, it is to be understood that the present invention may be applied to other devices.

It is to be understood that various modifications and alternations may be possible without departing from the spirit and scope of the claim.

The meritorious effects of the present invention are summarized as follows.

As mentioned above, in the information processing system, information processing method and a recording medium of the present invention, an image for conducting a given presetting is displayed, an operation to conduct the presetting corresponding to the image is performed. Presetting corresponding to the operation is conducted. Information representative of whether or not the operation guidance to guide the operation corresponding to the image is stored for each image. Determination whether or not the operation is incorrect is made. The rate at which the operation is incorrect is calculated based upon a result of determination. Determination whether or not the operation guidance is to be displayed on the screen is made based upon the calculated rate. Stored information representative of whether the operation guidance to guide the operation corresponding to the image is updated based upon a result of the determination. Based upon the stored information, the operation guidance is displayed on the screen. Alternatively, the period of time since an image is displayed until the operation corresponding to the image is conducted is measured. The stored information representative of whether or not the operation guidance for guiding the operation corresponding to the image is updated in response to a result of measurement. The operation guidance is displayed on a screen based upon stored information.

Accordingly, determination whether or not the operation guidance is necessary is automatically made for each image shot based upon the user's usage. The operation guidance may be displayed in predetermined timing if necessary. An enhancement in ease of operation can be achieved for each of individual users.

It should be noted that other objects, features and aspects of the present invention will become apparent in the entire disclosure and that modifications may be done without departing from the gist and scope of the present invention as disclosed herein and claimed as appended herewith.

Also it should be noted that any combination of the disclosed and/or claimed elements, matters and/or items may fall under the modifications aforementioned.

What is claimed is:

1. An information processing system for a portable telephone comprising:

(a) a display unit for displaying an image on a screen for performing a predetermined presetting;

(b) operating means for conducting an operation corresponding to said image, wherein said image includes one of a plurality of presetting images;

(c) presetting means for conducting presetting, in response to said operation which is conducted by said operating means;

(d) a storing unit for storing information which is representative of whether or not a corresponding operation guidance for guiding said operation corresponding to said one of the plurality of presetting images conducted by said operating means is to be displayed for each of said one of the plurality of presetting images;

(e) first determining means for determining whether or not the operation conducted by said operating means is correct;

(f) calculating means for calculating a rate at which the operation conducted by said operating means is incorrect based upon a result of the determination made by said first determining means;

(g) second determining means for determining whether or not said operating guidance is to be displayed based upon said rate which is calculated by said calculating means;

(h) updating means for updating the information representative of whether or not the operation guidance for guiding said operation corresponding to said image is displayed by said operating means, wherein the information is stored in said storing unit in response to a result of the determination made by said second determining means;

(i) operation guidance displaying means for displaying said operation guidance based upon said information stored in said storing unit; and (j) adjusting means which is adjustable by the user for adjusting a period of time from a time said presetting image is displayed until said operating guidance is displayed, wherein the adjusting means makes adjustments based upon the rate at which the operation conducted by said operating means is incorrect, which is calculated by said calculating means.

2. An information processing method for a portable telephone comprising the steps of:

(a) displaying step of displaying a presetting image on a screen for performing a predetermined presetting;

(b) operating step of conducting an operation corresponding to said presetting image, wherein said image includes one of a plurality of presetting images;

(c) presetting step of conducting presetting, in response to said operation which is conducted by said operating step;

(d) a storing unit for storing information which is representative of whether or not a corresponding operation guidance for guiding said operation corresponding to said one of the plurality of presetting images conducted in said operating step is to be displayed for each of said plurality of presetting images;

(e) first determining step for determining whether or not the operation conducted by said operating step is correct;

(f) calculating step for calculating a rate at which the operation conducted by said operating step is incorrect based upon a result of the determination made by said first determining step;

(g) second determining step for determining whether or not said operating guidance is to be displayed based upon said rate which is calculated by said calculating step;

(h) updating step for updating the information representative of whether or not the operation guidance for guiding said operation corresponding to said image is displayed by said operating step, wherein the information is stored in said storing step in response to a result of the determination made by said second determining step;

(i) operation guidance displaying step for displaying said operation guidance based upon said information stored in said storing step; and (j) adjusting step which is adjustable by the user for adjusting a period of time from a time said presetting image is displayed until said operating guidance is displayed, wherein the adjusting step makes adjustments based upon the rate at which the operation conducted by said operating step is incorrect, which is calculated by said calculating step.

3. A computer readable program product for executing an information processing process of a portable telephone, comprising the steps of:

(a) displaying step of displaying a presetting image on a screen for performing a predetermined presetting;

(b) operating step of conducting an operation corresponding to said presetting image, wherein said presetting image is one of a plurality of presetting images;

(c) presetting step of conducting presetting, in response to said operation which is conducted by said operating step;

(d) a storing unit for storing information which is representative of whether or not a corresponding operation guidance for guiding said operation corresponding to said one of presetting image conducted in said operating step is to be displayed for each of said one of the plurality of presetting images;

(e) first determining step for determining whether or not the operation conducted by said operating step is correct;

(f) calculating step for calculating a rate at which the operation conducted by said operating step is incorrect based upon a result of the determination made by said first determining step;

(g) second determining step for determining whether or not said operating guidance is to be displayed based upon said rate which is calculated by said calculating step;

(h) updating step for updating the information representative of whether or not the operation guidance for guiding said operation corresponding to said presetting image is displayed by said operating step, wherein the information is stored in said storing step in response to a result of the determination made by said second determining step;

(i) operation guidance displaying step for displaying said operation guidance based upon said information stored in said storing step; and (j) adjusting step which is adjustable by the user for adjusting a period of time from a time said presetting image is displayed until said operating guidance is displayed, wherein the adjusting step makes adjustments based upon the rate at which the operation conducted by said operating step is incorrect, which is calculated by said calculating step.

* * * * *